United States Patent

[11] 3,581,478

| [72] | Inventor | Peter W. Smith<br>1, Stratton Avenue, Clay Hill, Enfield, England |
|---|---|---|
| [21] | Appl. No. | 801,001 |
| [22] | Filed | Feb. 20, 1969 |
| [45] | Patented | June 1, 1971 |
| [32] | Priority | Feb. 21, 1968 |
| [33] | | Great Britain |
| [31] | | 8459/68 |

[54] FILTER AND FILTER ASSEMBLY
3 Claims, 7 Drawing Figs.

[52] U.S. Cl. ................................................. 55/484,
49/463, 55/502, 55/503, 55/504, 55/511, 98/40
[51] Int. Cl. .................................................... B01d 25/22
[50] Field of Search ........................................... 55/480,
482—484, 490, 493, 496, 502, 504, 508, 511, 501,
503; 98/40; 49/463, 464; 160/369; 52/476

[56] References Cited
UNITED STATES PATENTS

| 2,546,187 | 3/1951 | Harward | 160/369 |
| 2,802,544 | 8/1957 | Lewis | 55/490 |
| 3,063,524 | 11/1962 | Kessler | 49/463 |
| 3,269,455 | 8/1966 | Gillotti | 287/189.36IT |
| 3,350,862 | 11/1967 | Nutting | 55/493 |
| 3,360,910 | 1/1968 | Soltis | 55/484 |

*Primary Examiner*—Frank W. Lutter
*Assistant Examiner*—Bernard Nozick
*Attorneys*—Emory L. Groff and Emory L. Groff, Jr.

ABSTRACT: An air or gas filter element composed of filter material in the form of a panel surrounded by a rectangular frame having a peripheral rim projecting in a direction at right angles to the general plane of the element, and an assembly composed of a plurality of the elements set in rectangular openings in a lattice structure built up of lengths of channel-section material pushed into sockets in joint members, resilient seatings in the channels with which the edges of the rim make airtight joints, and quick-release clamps to retain the elements in the lattice.

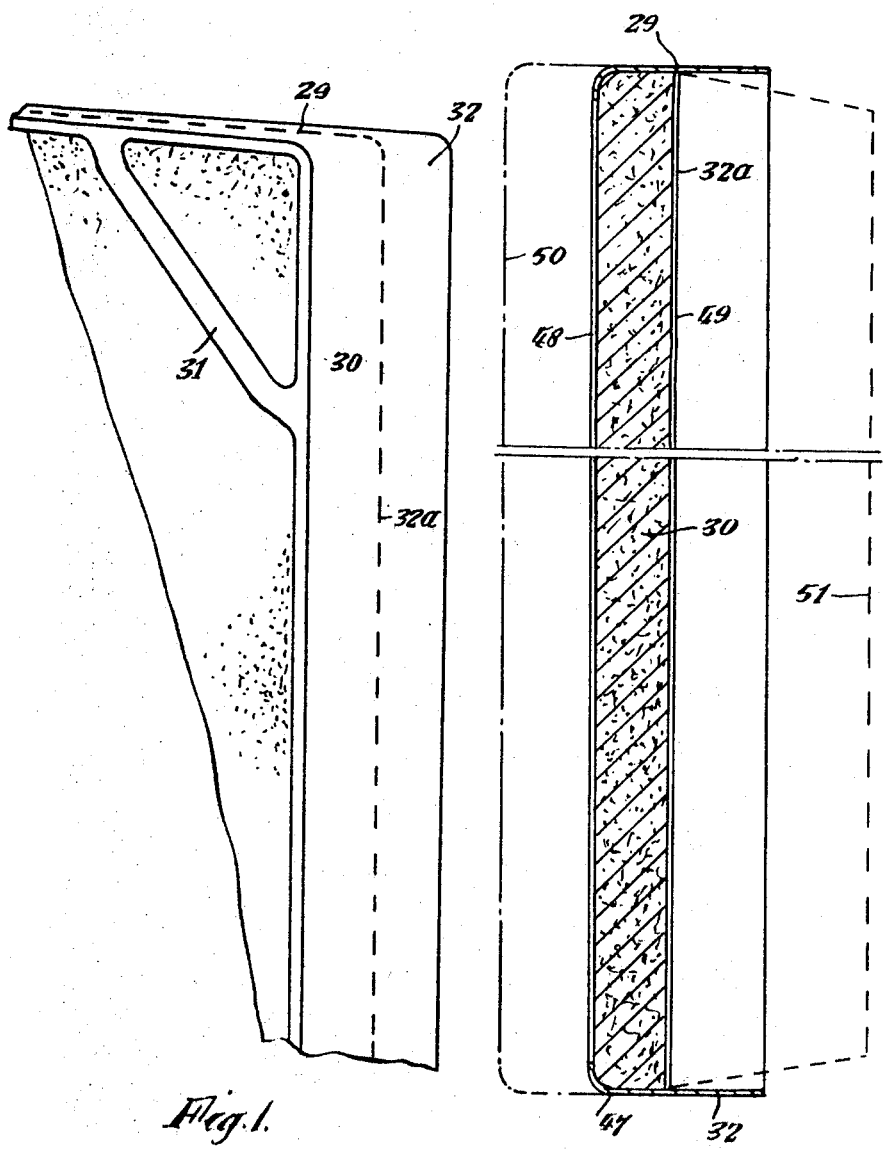

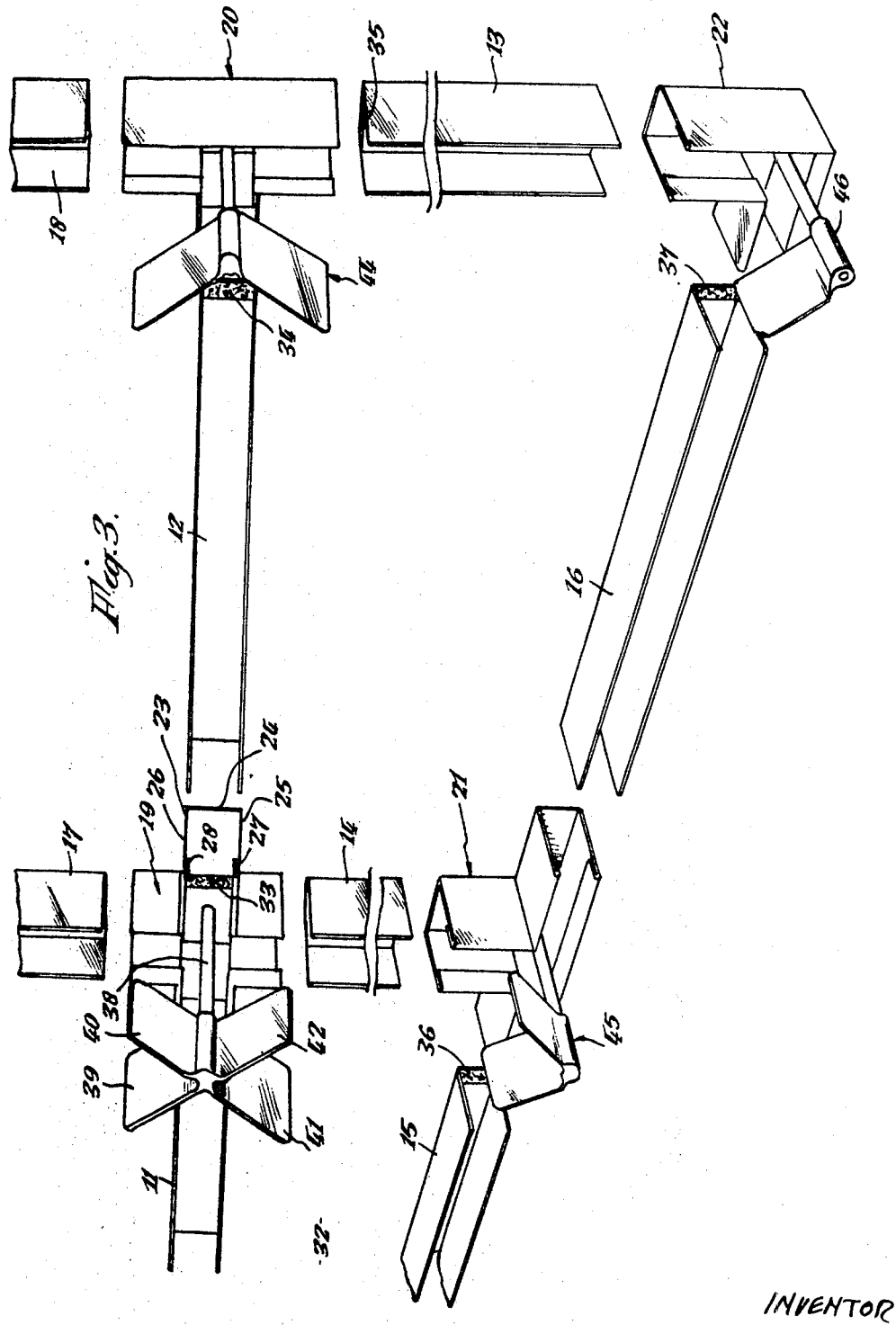

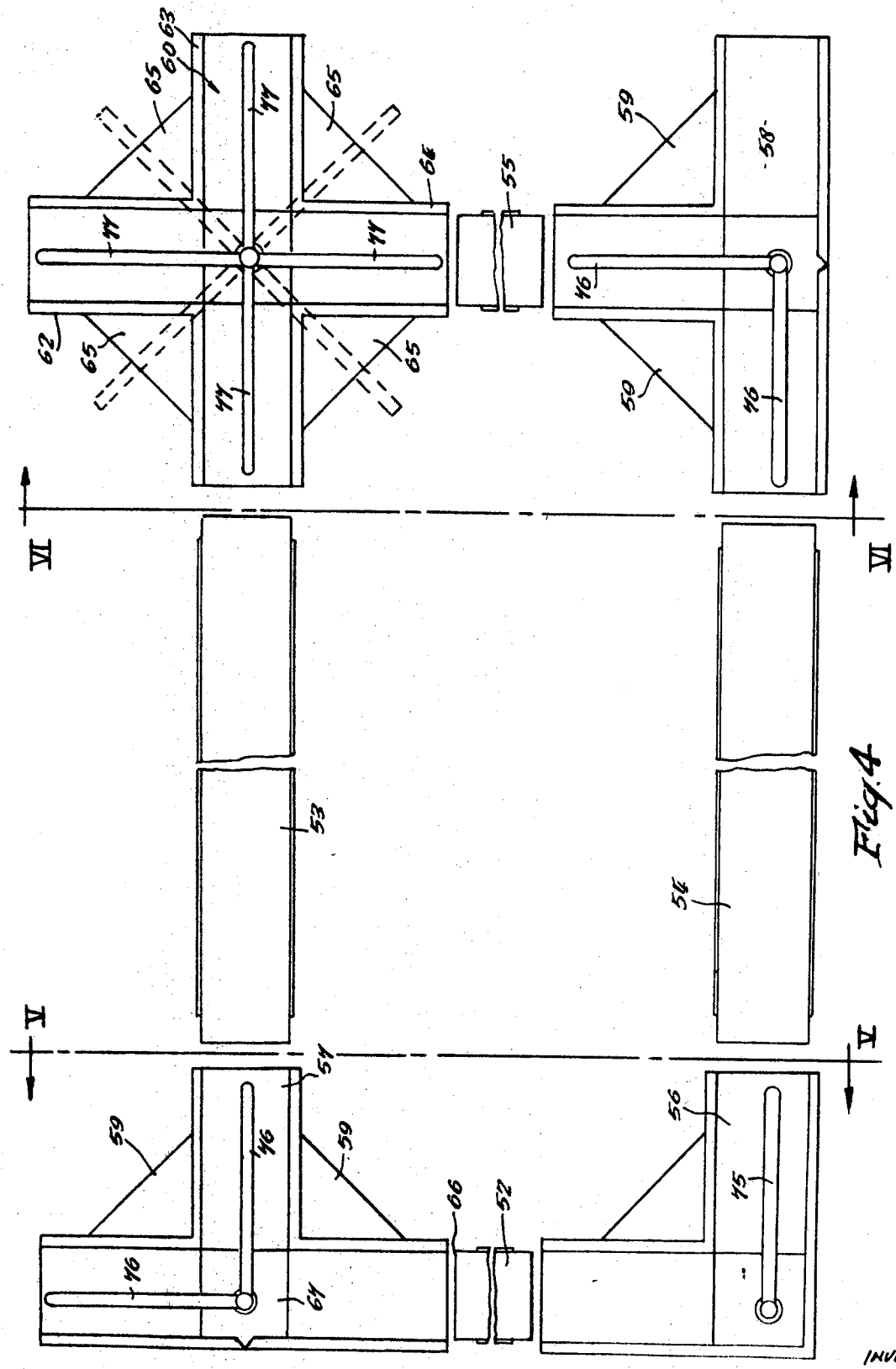

PATENTED JUN 1 1971 3,581,478
SHEET 4 OF 5
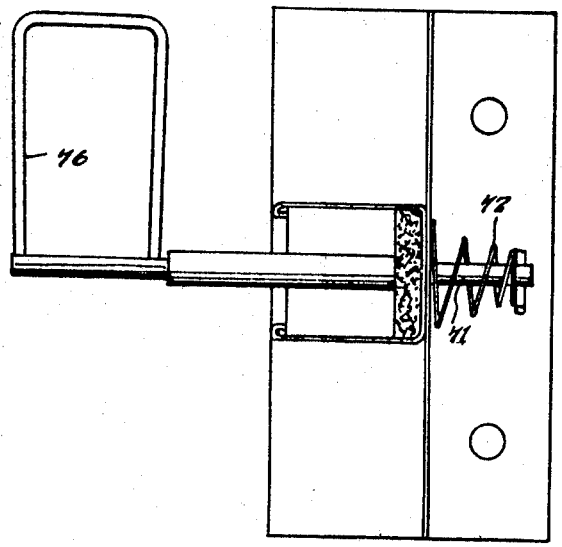
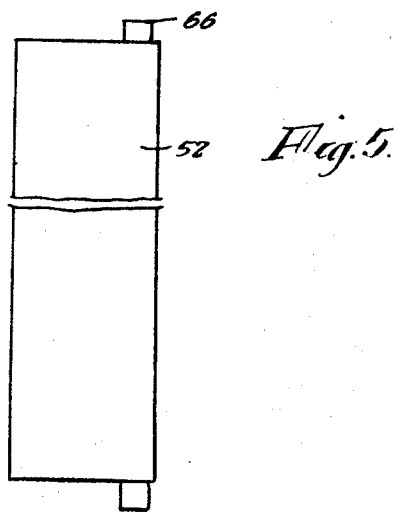
Fig.5.
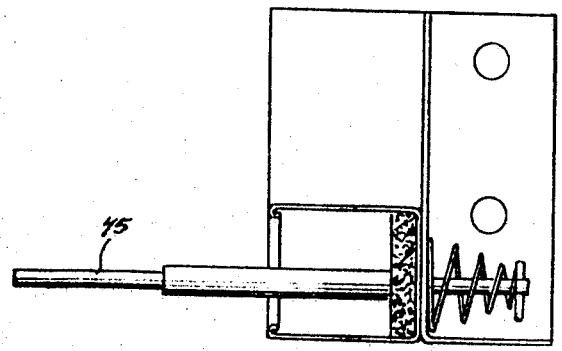
INVENTOR
PETER W. SMITH
By Emory L. Groff Atty

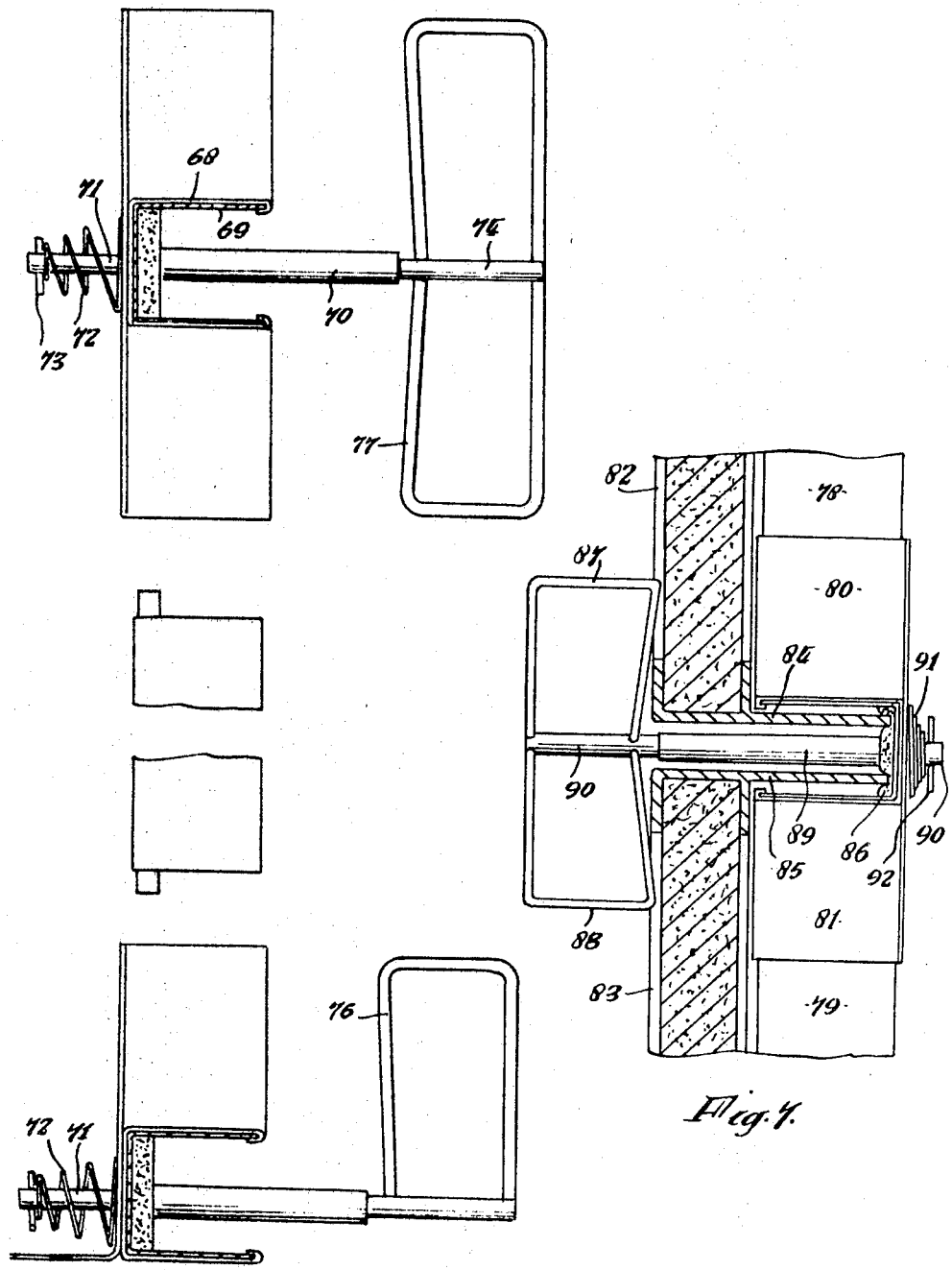

FILTER AND FILTER ASSEMBLY

This invention relates generally to the filtration of air and other gases, and more particularly to a novel form of filter element and a filter assembly incorporating a plurality of the filter elements.

In ventilating systems for buildings it is usual to place an air filter in the path of the ventilating air which is being blown into the building to be ventilated, and it is often convenient to fit a filter of this kind n an air duct or passageway. In manufacturing filters for different kinds of installation it is a common practice to make the filters in the form of comparatively small elements or panels nd to use a number of them to cover the area of the air duct or passageway. This enables the manufacture of standard filter elements and facilitates replacement of the filter elements or panels when it becomes necessary.

The principal object of the invention is to provide a filter and a filter assembly incorporating a supporting structure, in which the filter elements or panels may be of simple construction, the assembly providing simple and rapid means for mounting filter elements of panels in such a way that an air seal is provided around each element to prevent the bypassing of unfiltered air around the elements, the elements being easily and quickly removable when replacement is required.

In one aspect the invention consists of an air filter element comprising a quantity of filter material formed into the shape of a panel, a rectangular frame composed of four side members surrounding the edges of the panel, and a rim around the periphery of the frame projecting in a direction at right angles to the general plane of the element.

The frame may include strengthening pieces lying obliquely across two opposite corners of the frame, the strengthening pieces also serving as handles.

Where a thicker element incorporating a greater quantity of filtering material is desired the element may project beyond the front of the frame or beyond the rear of the frame inside the rim.

In another aspect the invention consists of an air filter assembly comprising a plurality of filter elements or panels of the kind defined above, a lattice structure built up of members joined together to define rectangular openings, each opening being of a size to permit entry of one filter element, a resilient seating at the bottom of each rectangular opening for engagement by the rim of the respective element, and means to clamp each filter element in position in the lattice.

Preferred embodiments of the invention will now be described with reference to the accompanying drawings, in which FIG. 1 is a pictorial view of one corner of a rectangular filter element or panel suitable for use in a filter assembly according to the invention;

FIG. 2 is a vertical section through a filter element or panel of the kind shown in FIG. 1;

FIG. 3 is a pictorial drawing of part of a lattice structure or supporting framework which may be used in a filter assembly according to the invention.

FIG. 4 is a view of the components for a portion of another lattice structure according to the invention immediately prior to assembly;

FIG. 5 is a side view of one end section of the structure of FIG. 4 looking in the direction of the arrow V-V;

FIG. 6 is a vertical section of the structure of FIG. 4 on the line VI-VI; and

FIG. 7 is a section through a joint member of the lattice structure of FIGS. 4 to 6 showing how two adjacent filter elements are clamped into position.

Referring to the drawings, FIG. 1 shows one corner of a filter element or panel which, with like elements or panels, may be used in a filter assembly according to the invention. This comprises a rectangular frame made up of a side 29 and a side 30 fixed to it at right angles, and two other sides which are not shown. Strengthening pieces 31, which also constitute handles for facilitating the removal or fitting of the panel, are fixed obliquely across opposite corners (only one of which is shown) of the element. A feature of the element is that it has a rim 32 which extends around the periphery of the rectangular frame and projects beyond the frame in a direction at right angles to the general plane of the filter element to the extent indicated by the dotted line 32a. This rim is intended to be seated on a resilient seat such as a strip of sponge rubber or foamed synthetic plastics material, the element being held in position with light pressure so as to form a seal which will not allow unfiltered air to bypass the filter element.

FIG. 2 is vertical section through the filter element of FIG. 1, the reference numerals being the same where appropriate. It shows the side 29, the side 30 and a third side 47. The front face of the element is indicated at 48 and the rear face is shown at 49. Where it is desired to provide additional thickness of filter material the filter may be extended at the front, as indicated by dotted line 50, or at the rear, as indicated by dotted line 51.

Referring to FIG. 3, there is shown an exploded view of a part of a lattice structure or framework according to the invention comprising separate lengths, respectively 11, 12, 13, 14, 15, 16, 17 and 18, of channel-section material. This may be rolled from strips of sheet metal or it may be in the form of an extruded metal or synthetic plastics material. The channel-section material is cut to desired lengths to build up a lattice structure of a specific size divided into rectangular sections.

The lengths of channel section material are joined together by means of joint members generally indicated at 19, 20, 21 and 22.

The joint member 19 is made up of four pieces of socket-section material (which maybe either metal or synthetic plastics material) such as that shown at 23 which is a large channel section having a web 24 and flanges 25 and 26 of such size that the channel sections 11 to 18 will just pass inside the socket section. To provide a well-fitting socket the flanges 25 and 26 are turned inwardly, respectively at 27 and 28, to embrace the flanges of the length 12, so that the length 12 (and the other lengths) are a close fit inside the socket section and can be assembled by applying substantial pressure or, for example, by tapping the far end of the section 12 with a mallet. The joint member 19 is made up of four pieces of socket channel section set at right angles to each other in one plane and joined together by cementing, welding or fixing down to a baseplate which holds the four pieces together. Similarly the joint member 20 is composed of three pieces of socket channel section all set at right angles to each other.

The joint member 21 is similar to the joint member 19 and is built up of three pieces of socket channel section set at right angles to each other and fixed together, while the joint member 22 is made up of two pieces of the socket channel section set at right angles and fixed together.

Where a base member is used it may be shaped in such a way as to provide strengthening webs between the two, three or four pieces of socket channel section.

Where elements of the type shown in FIGS. 1 and 2 are to be fitted into the lattice structure shown in FIG. 3 strips of the said resilient material are placed in the bottoms of the channels and are indicated by references 33, 34, 35, 36 and 37.

Each joint member is provided with a clamp which is shown diagrammatically. The clamp associated with the socket member 19 comprises a rod or stem 38 which is fixed at one end to the base of the joint member 19. At its other end it is provided with a clamp formed of four wings, respectively 39, 40, 41 and 42. The clamp is either screwed on to the stem 38 or it may be arranged that the rod 38 passes right through he clamp and has a spring at its outer end urging the clamp towards the base of the joint member. In either case it is only necessary to place four of the filter elements of the kind shown in FIG. 1 into position in the four rectangular openings around the joint member 19 and then to rotate the clamp member so that one wing extends diagonally across the corner of each one of the filter elements. Each filter element is then held in position at one corner with the rim 32 pressed sufficiently into the associated strip of sponge rubber or foamed synthetic plastics material to form a joint which is airtight at the low air pressured used in ventilating systems.

The joint members 20 and 21 are each provided with a clamp, respectively 44 and 45 each provided with two wings to engage the corners of two filter elements, while the joint member 22 is provided with a clamp 46 having a single wing to engage the corner of one filter element.

In order to lock the parts together the web of each length of channel-section material may be formed near its ends with one or more dimples (not shown) and the webs of the socket sections may be formed with corresponding dimples so that when the parts are pushed into engagement the respective dimples interengage and resist any tendency of the parts to disengage. End stops may also be provided to ensure that the lengths of channel section are pushed into the joint members to just the correct extent, so that the correct rectangular form of the lattice structure is maintained.

FIGS. 4 to 6 illustrate another form of lattice structure for use in carrying out the invention. The structure comprises four channel members, respectively 52, 53, 54 and 55. A joint member 56 is composed of two pieces of socket section fixed together, as for example by welding, so that the pieces are at right angles and the socket section is of such size that the channel members will slide into them with sufficient friction to form a rigid joint. Above the joint member 56 is a further joint 57, which forms a t-joint, and is made up of three pieces of socket section joined together. The joint member 57 will accept the pieces 52 and 53 of channel section and a third piece which is not shown.

A joint member 58 forming part of the lower portion of the structure is also in the form of a t-piece and is of the same construction as the joint member 57. The joint members 57 and 58 have strengthening webs 59 to ensure that they are quite rigid. A joint member generally indicated by reference 60 is made up of four pieces, respectively 61, 62, 63 and 64, of the socket section fixed together, with strengthening webs 65 between each two adjacent pieces. Each of the lengths 52, 53, 54 and 55 of channel section has a strip of foamed rubber or similar resilient material cemented into it, the strips being indicated in FIGS. 4, 5 and 6 by reference 66. The strips 66 are allowed to project beyond the ends of the channels to ensure that they will make an airtight joint with square pieces 67 of similar resilient material which are cemented into the joint members.

As shown in FIG. 6, the joint members are made up of pieces of socket section, indicated at 68, and the channel section members 69 slide into them. At the center of each joint member is a hole concentrically around which one end of a tube 70 is welded to the joint member; the said tube slidably houses therein a rod 74 a portion 71 of which passes through the hole. A beehive spring 72 is placed over the portion 71 and is retained by a split pin, circlip or other convenient abutment means 73. The rod 74 also has an extension at its other end and one or more pieces of wire, each bent to form a wing, is fixed to it. Thus, the joint member 56 has a single wing 75, the members 57 and 58 have two wings 76 set at right angles, and the joint member 60 has four wings 77 set mutually at right angles The wings of the four joint members are shown in the position in which filter panels may be pushed into the adjacent openings formed by the channel members and joint members and when the filter panels have been inserted the wing or wings are pulled outwardly to compress the respective spring 72, then rotated through 45° and released, whereupon the wing or wings will move inwardly under the pull of the respective spring 72 to grip the corner, or the corners, of the adjacent filter panel or panels.

It will be evident that the whole of the lattice structure may easily be built up from standardized parts and when put together will form a structure which is sufficiently rigid to support the filter panels as described, or other objects.

FIG. 7 is a section through one of the joint members showing filter panels actually in position. As shown in this FIGURE there are two lengths of channel, respectively 78 and 79, engaged respectively in pieces 80 and 81 of the socket section of which the joint member is built up. Two filter panels 82 and 83 lie in adjacent openings in the lattice structure and have rearwardly extending rims, respectively 84 and 85, which engage and compress the resilient foamed rubber sealing strip 86. The filter panels are retained in position by the wings 87 and 88 of a wing clamp which comprises a tube 89 having an end welded to the joint member concentrically around a central hole therein. Slidably mounted and extending through the tube 89 is a rod 90 to the front end of which the wings 87 and 88 are secured; the other end of the rod 90 passes through said central hole and is provided with a beehive spring 91 retained in position by a split pin or equivalent abutment member 92.

It is to be understood that the filter assembly according to the invention is not limited to the lattice structure described. Any other supporting structure may be used, provided that it has the rectangular subdivisions and the resilient seats.

Although an air filter has been referred to, it is to be understood that this term includes filters for removing solid particles, such as dirt, from other gases.

I claim:

1. A filter assembly for gaseous media comprising a plurality of filter elements retained in a lattice structure; each filter element comprising a quantity of filter material for a gaseous medium formed into the shape of a panel, a rectangular frame surrounding the edges of the panel and retaining the filter material, and a peripheral rim of thin section projecting from the rectangular frame and lying parallel to the direction of flow of gaseous medium through the element when in use; the lattice structure defining a number of rectangular openings equal to the number of elements, one element being located over each opening, the structure comprising a number of lengths of channel-section material defining first channels having side flanges. In a number of joint members each composed of at least two pieces of socket-section material joined together to form sockets set at right angles to each other in one plane and defining second channels having side flanges, the socket-section material being of lager channel section than the first channels and such size as to allow the said first channels to slide into the ends of the joint members and defining rectangular openings in the lattice structure, the second channels having the ends of the flanges turned in to embrace the edges of the flanges of the said first channels, resilient seating means at the bottom of and within each of the first channels upon which the rim of an element may seat, and quick clamping means mounted on each joint member to clamp the corner of each filter element located at an adjacent opening to press the edge of the rim into the resilient seating means to form an airtight joint.

2. An assembly as claimed in claim 1 in which each clamping means comprises a rod projecting from the associated joint member, a wing projecting sideways from the rod for each filter element to be clamped, the wings being mutually at right angles if there are more than one, the wing being rotatable so that it may be rotated to lie parallel to a length of the channel section material to allow insertion of a filter element and then rotated to a clamping position.

3. An assembly as claimed in claim 2 comprising spring means to draw each wing into engagement with the element to be clamped.